United States Patent [19]

Norota et al.

[11] Patent Number: 4,825,841

[45] Date of Patent: May 2, 1989

[54] DIAGNOSIS DEVICE FOR AN INTERNAL COMBUSTION ENGINE EXHAUST GAS RECYCLING DEVICE

[75] Inventors: Kazuhiko Norota, Toyota; Mamoru Yoshioka; Hidemi Ohnaka, both of Susono, all of Japan

[73] Assignee: Toyota Jidosha Kabushiki Kaisha, Aichi, Japan

[21] Appl. No.: 149,561

[22] Filed: Jan. 28, 1988

[30] Foreign Application Priority Data

| Feb. 3, 1987 | [JP] | Japan | 62-024180 |
| Feb. 6, 1987 | [JP] | Japan | 62-026749 |
| Apr. 20, 1987 | [JP] | Japan | 62-098001 |
| Apr. 20, 1987 | [JP] | Japan | 62-098002 |
| Apr. 20, 1987 | [JP] | Japan | 62-098003 |
| Apr. 20, 1987 | [JP] | Japan | 62-098008 |

[51] Int. Cl.$^4$ .................................. F02M 25/06
[52] U.S. Cl. ..................... 123/571; 364/431.06

[58] Field of Search ............... 123/568, 569, 571; 364/431.06

[56] References Cited

U.S. PATENT DOCUMENTS

| 4,375,800 | 3/1983 | Otsuka et al. | 123/571 |
| 4,433,666 | 2/1984 | Masaki et al. | 123/571 X |
| 4,461,263 | 7/1984 | Hasegawa | 123/571 |
| 4,541,398 | 9/1985 | Kishi | 123/571 |
| 4,665,882 | 5/1987 | Otobe | 123/571 |
| 4,690,120 | 9/1987 | Egle | 123/571 |
| 4,715,348 | 12/1987 | Kobayashi et al. | 123/571 |

*Primary Examiner*—Willis R. Wolfe
*Attorney, Agent, or Firm*—Oliff & Berridge

[57] ABSTRACT

A diagnosis device of an exhaust gas recycling device of an internal combustion engine checks operating conditions of the engine and determines whether the engine is operating with performance of exhaust gas recycling based upon the checked conditions by modifying them according to atmospheric pressure.

9 Claims, 11 Drawing Sheets

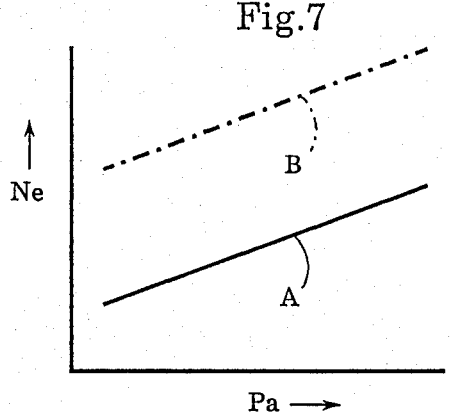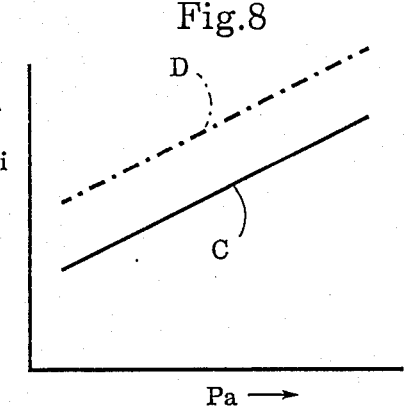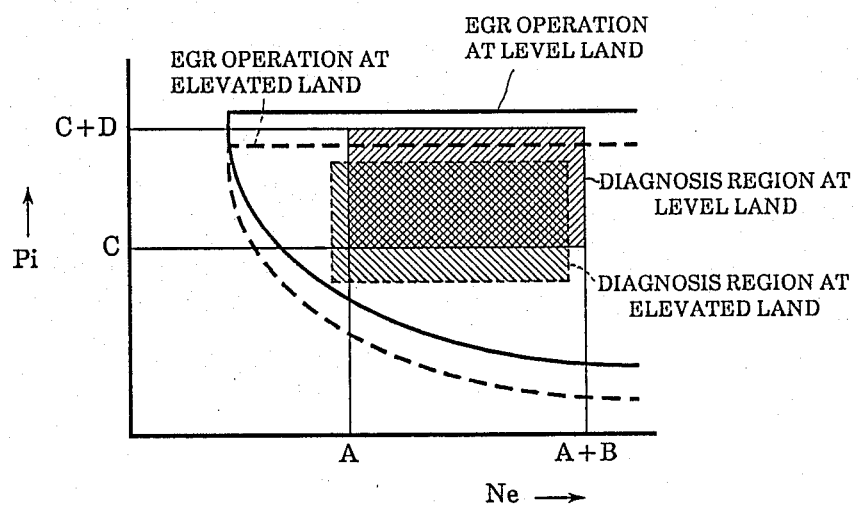

DIAGNOSIS DEVICE FOR AN INTERNAL COMBUSTION ENGINE EXHAUST GAS RECYCLING DEVICE

BACKGROUND OF THE INVENTION

The present invention relates to a diagnosis device for determining whether or not an internal combustion engine exhaust gas recycling device used in a vehicle such as an automobile is functioning correctly, and particularly relates to a diagnosis device which carries out reliable fault diagnosis regardless of changes in the environmental conditions.

In an internal combustion engine used in a vehicle such as an automobile, in order to reduce the NOx in the exhaust gas, conventionally various types of exhaust gas recycling devices have been incorporated to recycle the exhaust gas. Such an exhaust gas recycling device is disclosed in for example Japanese Utility Model Laying Open Publication Sho No. 54-121116 (1979), Japanese Patent Laying Open Publication Sho No. 58-88450 (1983), and Japanese Patent Publication Sho No. 60-24303 (1985).

Generally an exhaust gas recycling device incorporates an exhaust gas recycling control valve for controlling the recycling flow rate of the exhaust gas, a vacuum control valve for controlling the background pressure, a temperature sensing valve, and so forth, and if there is a fault in any of these structural components, the exhaust gas recycling will no longer be carried out and there is a danger of the internal combustion engine beeing operated in a state where the reduction in NOx in the exhaust gas is not carried out. Even if the exhaust gas recycling is not carried out because of a failure, the internal combustion engine will still operate without failing, and may therefore be driven for a long time without the driver realizing; this gives rise to atmospheric pollution problems. Additionally, in certain operating conditions, if exhaust gas recycling is not carried out then there is a danger of knocking occurring, and also it is possible for the fuel consumption to be worsened by pump loss from the intake of the internal combustion engine itself.

In view of the above situation, a failure alarm device has already been proposed constructed such that when the exhaust gas recycling has stopped because of a failure of the exhaust gas recycling device the user is informed and given an opportunity for repair, and this is disclosed in for example Japanese Utility Model Laying Open No. Publication Sho 49-64623 (1974) (Japanese Utility Model Publication Sho No. 52-9471 (1977), in Japanese Utility Model Laying Open Publication Sho No. 50-67220 (1975), and also in Japanese Utility Model Application Sho No. 60-163288 (1985) (Japanese Utility Model Laying Open Publication Sho No. 62-7163 (1987) by the same applicant as the applicant in the present application.

Fault diagnosis of the exhaust gas recycling device may be carried out basically by, under conditions in which exhaust gas recycling should be carried out, determining whether or not, for example, the temperature within an exhaust gas recycling passage is at least a certain value, in other words by determining that if that temperature is not more than a cetain value exhaust gas is not flowing in the exhaust gas recycling passage, and thus determining that the exhaust gas recycling device has failed, but if it is simply supposed that exhaust gas recycling should be carried out when various parameters indicating operating conditions such as the intake pressure or intake flow rate of the internal combustion engine or the engine rotation speed, have certain values, then when the atmospheric pressure fluctuates because of for example high altitude driving, since the intake pressure will fluctuate correspondingly, the conditions for exhaust gas recycling will not be determined appropriately, and there is a danger that the fault diagnosis of the exhaust gas recycling device will not be carried out correctly. Particularly when the exhaust gas recycling control is carried out from the intake pressure, the ranges of intake pressure and engine revolution rates in which exhaust gas recycling are carried out will fluctuate according to the atmospheric pressure fluctuation.

Fault diagnosis of the exhaust gas recycling device may be carried out basically by, under conditions such that exhaust gas recycling should be carried out, determining whether or not, for example, the temperature within an exhaust gas recycling passage is at least a certain value, in other words by determining that when the exhaust gas recycling passage temperature is not more than a certain value exhaust gas is not flowing in the exhaust gas recycling passage, and thus determining that the exhaust gas recycling device has filed, but when the exhaust gas recycling is started the temperature within the exhaust gas recycling passage does not rise rapidly, and moreover this temperature rise is further delayed the lower the outside temperature. Therefore a false diagnosis may easily be made if the fault diagnosis is carried out simply by determining if the exhaust gas recycling passage temperature is at least a certain value under conditions in which exhaust gas recycling should be carried out.

The present invention considers the above state of affairs, and has as its object the provision of an improved exhaust gas recycling device diagnosis device which carries out accurate fault diagnosis always with no erroneous diagnoses even if the atmospheric pressure fluctuates or the outside air temperature fluctuates.

SUMMARY OF THE INVENTION

The above objective is achieved according to the present invention by a diagnosis device for an internal combustion engine exhaust gas recycling device which carries out fault diagnosis of the exhaust gas recycling device by determining a time when parameters indicating the operating condition of the internal combustion engine have certain values as a time to carry out exhaust gas recycling, and detecting whether or not exhaust gas recycling is actually being carried out at this time, characterized by comprising an atmospheric pressure detecting means detecting the atmospheric pressure, and a correction means correcting certain values of said parameters according to the atmospheric pressure detected by said atmospheric pressure detecting means.

According to the above construction, in the operating region in which exhaust gas recycling should be carried out the comparison values of the parameters indicating driving conditions such as intake manifold pressure, intake flow rate or engine revolution rate, which are used to determine whether or not the operating region is such that exhaust gas recycling should be carried out, are subject to an atmospheric pressure compensation, and thereby even if the atmospheric pressure fluctuates the decision as to whether or not the operating region is such that exhaust gas recycling should be carried out based on these parameters is carried out accurately, and thus an accurate diagnosis is carried out.

The diagnosis device according to the present invention may be constructed so that when the atmospheric pressure detected by the atmospheric pressure detecting means is not more than a certain value diagnosis is prevented from occurring.

The parameter or parameters may be at least one of the intake manifold pressure and the intake flow rate of the internal combustion engine and the internal combustion engine revolution rate, or may be a combination of the intake mainfold pressure of the internal combustion engine and the engine revolution rate.

Again the parameter may be the intake air amount per stroke of the internal combustion engine derived from the air intake flow rate of the internal combustion engine and the engine revolution rate, and the construction may be such that a decision is made that exhaust gas recycling should be carried out when the intake amount of air per stroke of the internal combustion engine is within a certain range.

Furthermore the parameters may be the air intake flow rate of the internal combustion engine and the intake air amount per stroke of the internal combustion engine calculated from this air intake flow rate and the engine revolution rate, and the construction may be such that a decision is made that exhaust gas recycling should be carried out when the air intake flow is at least a certain value and the air intake flow rate per stroke of the internal combustion engine is not more than a certain value.

In the diagnosis device according to the present invention, the detection of the atmospheric pressure may be carried out by an ordinary aneroid type atmospheric pressure sensor.

Again the diagnosis device according to the present invention may use as an atmospheric pressure sensor the intake mainfold pressure sensor, by determining the atmospheric pressure from the value of the intake manifold pressure detected by this intake manifold pressure sensor immediately before starting the internal combustion engine.

Alternatively the atmospheric pressure may be determined from an air/fuel ratio learning high altitude compensation factor for the air/fuel ratio control of the internal combustion engine.

The detection of whether or not the exhaust gas recycling is actually being carried out may be based on whether the temperature in an exhaust gas recycling passage is not more than a certain value over a certain time interval, and this time interval may be determined depending on the external temperature.

Thus the fault diagnosis time is set according to the outside temperature, and thereby an erroneous decision to the effect that the exhaust gas recycling device has failed caused by the fact that the external temperature is low is avoided, and an accurte fault diagnosis with high reliability can be carried out.

BRIEF DESCRIPTION OF THE DRAWINGS

FIG. 7 and FIG. 8 are graphs showing decision value characteristics in the embodiment shown in FIG. 6;

FIG. 9 is a graph showing variations in the EGR operating region and diagnosis region with fluctuations in atmospheric pressure in the embodiment shown in FIG. 6;

DETAILED DESCRIPTION OF THE INVENTION

The present invention is now described in detail with reference to the drawings in respect of embodiments.

Figure 1:
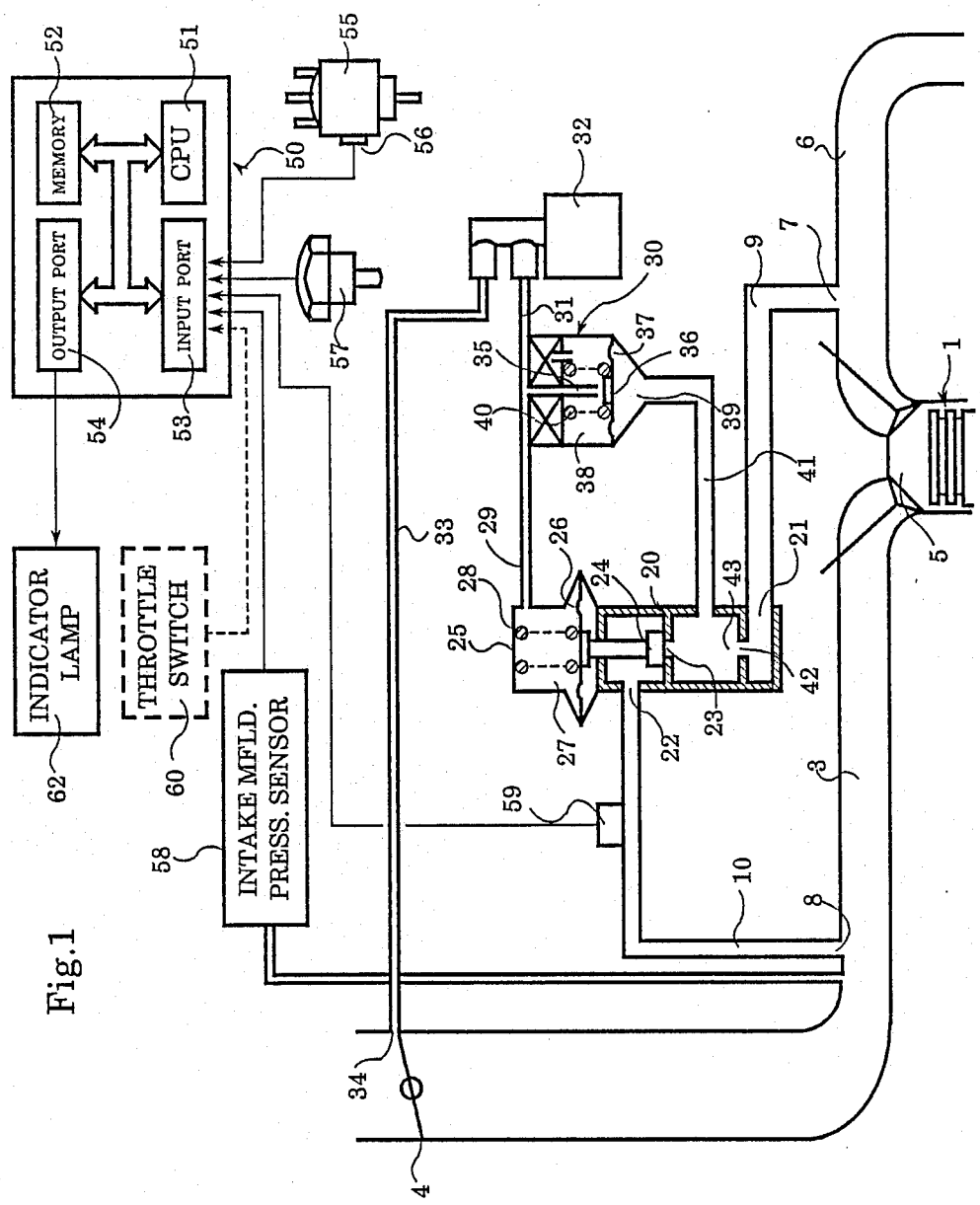
FIG. 1 is a schematic structural diagram of one embodiment of an exhaust gas recycling device incorporating a diagnosis device according to the present invention.

FIG. 1 shows one embodiment of an exhaust recycling device in which is incorporated the diagnosis device according to the present invention. In the drawing, 1 indicates an internal combustion engine, and this internal combustion engine takes in mixture to a combustion chamber 5 through a throttle valve 4 and an intake manifold 3; the combustion products, in other words the exhaust gases, are expelled to an exhaust manifold 6.

The exhaust manifold 6 is provided with an exhaust gas take-in port 7 for exhaust gas recycling, and the inlet mainfold 3 is provided with an exhaust gas introduction port 8; the exhaust gas take-in port 7 and the exhaust gas introduction port 8 are connected by an exhaust gas recycling line 9, an exhaust gas recycling control valve 20, and a line 10, in series.

The exhaust gas recycling control valve 20 is provided with an inlet port 21 and an outlet port 22, the inlet port 21 is connected by the line 9 to the exhaust gas take-in port 7, and the outlet port 22 is connected by the line 10 to the exhaust gas introduction port 8. The exhaust gas recycling control valve 20 is provided with a valve port 23 and a valve element 24; the valve port 23 is opened and closed by the valve element 24 and the opening is controlled so that the flow rate of exhaust gas recycling is controlled. The valve element 24 is connected to a diaphragm 26 of a diaphragm device 25, and when a negative pressure exceeding a certain value, for example −70 mmHg, is not present within a diaphragm chamber 27, it is urged downwards by the spring force of a compression coil spring 28 and closes the valve port 23; when a negative pressure exceeding the certain value is introduced into the diaphragm chamber 27, then this negative pressure overcomes the spring force of the compression coil spring 28 and it rises to open the valve port 23.

The diaphragm chamber 27 of the exhaust gas recycling control valve 20 is connected by a line 29, a negative pressure control valve 30 for background pressure control, a line 31, a temperature sensitive valve 32, and a line 33 to an inlet manifold negative pressure take-out port 34. The inlet manifold negative pressure take-out port 34 is, as shown in the diagram, provided in such a position as to be upstream of the throttle valve 4 when in the fully closed position, but downstream of the throttle valve 4 when it is opened more than a relatively small amount.

The negative pressure control valve 30 has a valve element 36 which opens and closes a valve port 35, and a diaphragm 37 which supports this valve element, and the diaphragm 37 delineates an atmospheric chamber 38 which is open to the atmosphere on the upper side in the drawing, and a idaphragm chamber 39 on the lower side in the drawing; when a pressure (positive pressure) of at least a certain value is not present in the diaphragm chamber 39 the diaphragm pulls the valve element 36 away from the value port 35 under the effect of the compression coil spring 40, and is in the position to open this valve port, whereas when the pressure of at least a certain value is introduced into the diaphragm chamber 39, the force of the compression coil spring 40 is overcome, the diaphragm moves upwards in the drawing, and the valve element 36 is held against the valve port 35 so that the position is such as to close the valve port.

The diaphragm chamber 39 of the negative pressure control valve 30 is connected by a line 41 to a pressure chamber 43 between the valve port 23 of the exhaust gas recycling control valve 20 and an orifice 42 provided downstream thereof, and thus has the exhaust gas pressure within the pressure chamber admitted to it.

The construction thus described of the negative pressure control valve 30 and the orifice 42 is a well known background pressure control construction, and in the exhaust gas recycling operating range in which the inlet mainfold negative pressure is applied to the exhaust gas recycling control valve 20 the negative pressure supplied to the diaphragm chamber 27 of the exhaust gas recyling control valve 20 is adjusted so as to maintain at a substantially constant value the exhaust gas pressure in the pressure chamber 43, or in other words the opening of the valve port 23 is adjusted, and thereby the ratio of the exhaust gas recycling flow rate to the intake air flow rate, or in other words the EGR ratio, is maintained at a substantially constant value.

The temperature sensitive valve 32 responds to the coolant temperature of the internal combustion engine 1, and when the engine is warming up and the coolant temperature is not more than a certain value, for example 60 degress C., then the value is closed and the connection between the lines 31 and 33 is shut off; on the other hand when the coolant temperature is at least a certain temperature a connection between the lines 31 and 33 is established.

According to the above construction, the exhaust gas recycling control valve 20 is opened when a negative pressure exceeding a certain value, for example −70 mmHg, is supplied to the line 29, and the coolant temperature of the internal combustion engine 1 is at least a certain value, for example 60 degrees C., so that the temperature sensitive valve 32 is open; the exhaust gas recycling is carried out with a flow rate corresponding to this degree of opening.

In the drawings, 50 indicates a microcomputer which carries out the diagnosis of the exhaust gas recycling device. The microcomputer 50 is of an ordinary construction, and has a central processing unit (CPU) 51, a memory 52, an input port 53, and an output port 54; it receives information relating to the revolution rate of the internal combustion engine 1 from a revolution rate sensor 56 provided on a distributor 55 of the internal combustion engine 1, information relating to the coolant temperature of the internal combustion engine 1 from a coolant temperature sensor 57, information relating to the intake manifold pressure from an intake manifold pressure sensor 58, and information relating to the temperature in the line 10 from a temperature sensor 59 provided at an intermediate point of the exhaust gas recycling line 10; based on this information, a diagnosis is made as to whether or not the exhaust gas recycling device is operating normally, according to the flowchart shown in FIG. 2 and FIG. 3, and when a decision is made that the exhaust gas recycling device is not operating normally, an indicator lamp 62 is illuminated.

The operation of the diagnosis device according to the present invention is now described with reference to the flowchart shown in FIG. 2.

Figure 2:
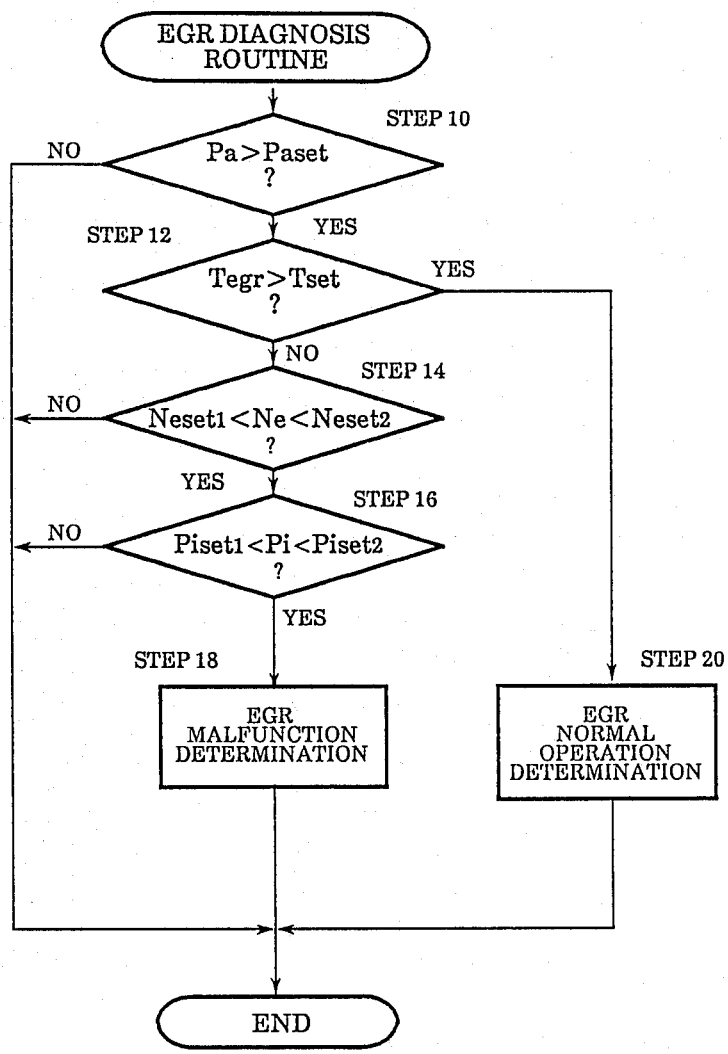
FIG. 2 is a flowchart showing the operation of the diagnosis device according to the present invention.
Figure 3:
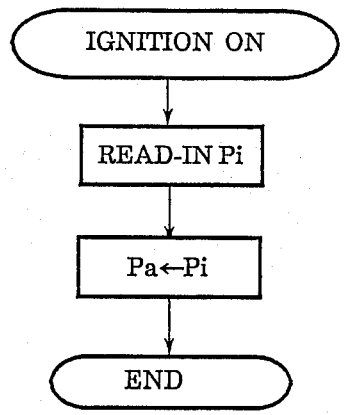
FIG. 3 is a flowchart showing an embodiment of a routine for determining atmospheric pressure in the exhaust gas recycling device diagnosis device according to the present invention.

The EGR diagnosis routine shown in FIG. 2 is executed as an interrupt routine at a certain interval, and first in step 10 a test is made as to whether or not the atmospheric pressure Pa determined as shown in FIG. 3, is at least a certain value. When Pa is more than Paset control proceeds to step 12 for the execution of diagnosis, whereas when Pa is not greater than Paset, diagnosis is not carried out, and the diagnosis interrupt routine ends.

In step 12, a decision is made as to whether or not the exhaust gas recycling passage temperature Tegr detected by the temperature sensor 59 exceeds a decision temperature Tset. When Tegr is greater than Tset, exhaust gas recycling is being carried out, and this being the normal situation, control proceeds to step 20; on the other hand if Tegr is not more than Tset, exhaust gas recycling is not being carried out, and control proceeds to step 14.

In step 14, a decision is made as to whether or not the revolution rate Ne of the internal combustion engine 1 detected by the revolution rate sensor 56 is at least certain value Neset1 and not more than a second certain value Neset 2 which is greater than Neset1. When Ne is greater than Neset1 and less than Neset 2, control proceeds to Ne is greater than Neset1 and less than Neset 2, control proceeds to step 16.

In step 16, a decision is made as to whether or not the intake manifold pressure Pi of the internal combustion engine 1 detected by the intake manifold pressure sensor 58 is at least a first certain value Piset1 and not more than a second certain value Piset2 which is greater than Piset1. When Pi is greater than Piset1 and less than Piset 2, control proceeds to step 18.

In step 18, the malfunction determination causes the indicator lamp 62 to be turned on. By the illumination of this indicator lamp 62, the user can be made aware that a failure has occurred in the exhaust gas recycling device.

In step 20, the normal operation decision causes the indicator lamp 62 to be turned off, or not turned on, and at this time the exhaust gas recycling device is operating normally.

In the above described embodiment, the atmospheric pressure Pa is determined as shown in FIG. 3 directly from the intake manifold pressure Pi detected by the intake manifold pressure sensor 58 immediately before the engine is started.

Figure 4:
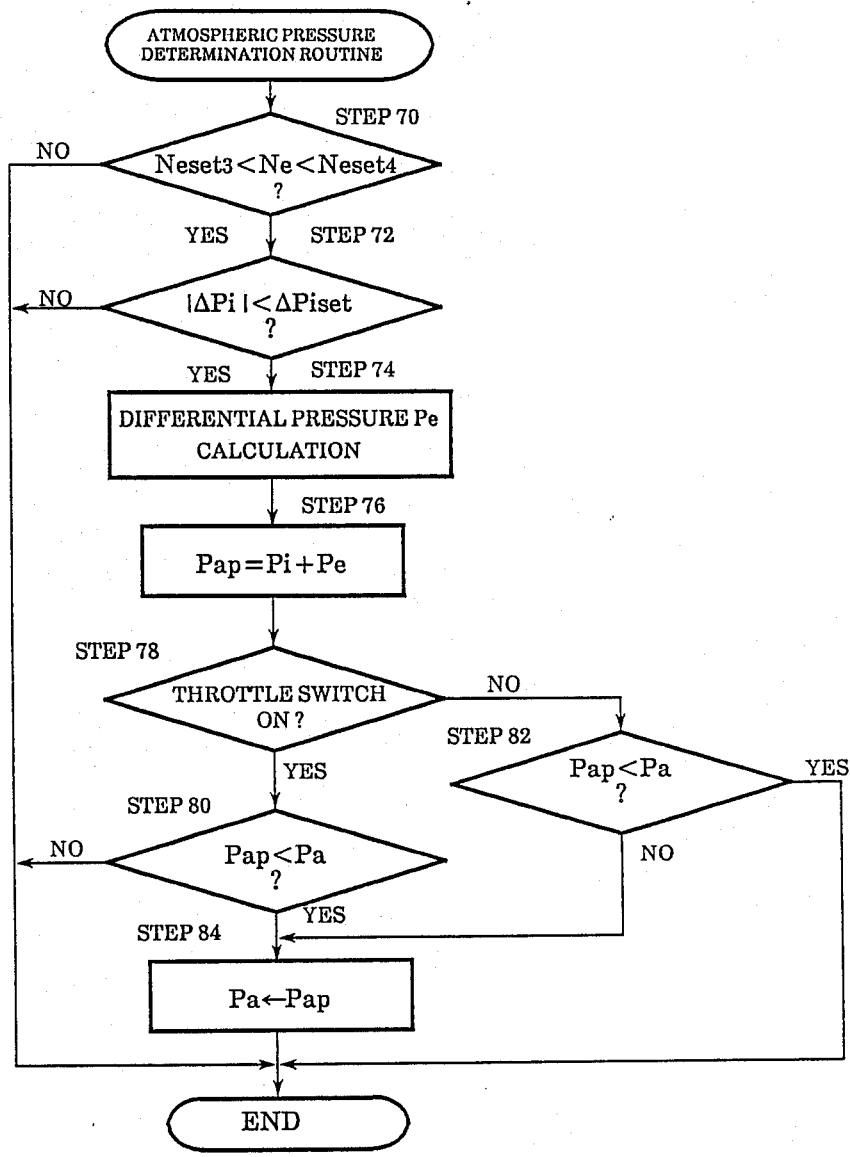
FIG. 4 is a flowchart showing another embodiment of an atmospheric pressure detection routine in the exhaust gas recycling device diagnosis device according to the present invention.

The determination of atmospheric pressure may also be carried out according to the flowchart shown in FIG. 4, and next a description of this method of atmospheric pressure detection is given with reference to the flowchart shown in FIG. 4.

The atmospheric pressure detection routine shown in FIG. 4 may be executed as an interrupt routine at a certain time interval, and initially in step 70, a test is made as to whether or not the engine revolution rate Ne of the internal combustion engine 1 detected by the revolution rate sensor 56 is at least a third certain value Neset 3 and is not more than a fourth certain value Neset4 which is greater than Neset 3. When Ne is greater than Neset3 and less than Neset4, control proceeds to step 72.

In step 72, a decision is made as to whether or not the absolute value of the rate of change of the intake manifold pressure Pi in a certain time interval, DELTA Pi, is not more than a certain value DELTA Piset. If the absolute value of DELTA Pi is less than DELTA Piset, control proceeds to step 74.

Figure 5:
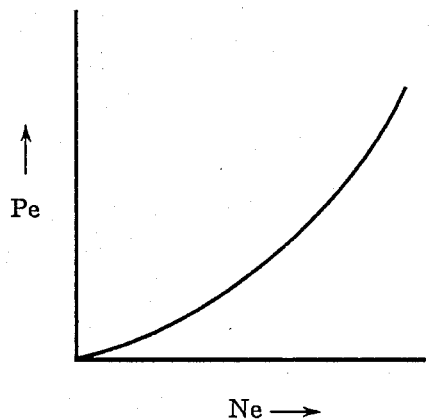
FIG. 5 is a graph showing differential pressure characteristics used in the atmospheric pressure detection routine shown in FIG. 4.

In step 74, a differential pressure Pe is determined according to a control value map as shown in FIG. 5, depending on the revolution rate Ne of the internal combustion engine 1 detected by the revolution rate sensor 56. This differential pressure Pe is the difference between the intake manifold pressure Pi at the throttle opening such that a throttle switch 60 described later opens and closes, and a standard atmospheric pressure, and this differntial pressure Pe increases with an increase in the revolution rate Ne.

After step 74, control proceeds to step 76, and in step 76, a derived value for atmospheric pressure Pap is calculated by adding the differential pressure Pe determined in step 74 to the intake manifold pressure Pi detected by the intake manifold pressure sensor 58. After step 76 control proceeds to step 78.

In step 78, a decision is made as to whether or not the throttle switch 60 is in the on site. The throttle switch 60 changes to the on state when the throttle valve 4 is opened to exceed a certain value, and goes to the off state when the throttle valve 4 is closed beyond the certain opening, and when the throttle switch 60 is in the on state control goes to step 80, whereas when the throttle switch 60 is not in the on state control goes to step 82.

In step 80, a comparison is made between the previously determined atmospheric pressure Pa and the newly determined derived atmospheric pressure value Pap, and if Pap is less than Pa, control goes to step 84.

In step 82, again a comparison is made between the previously determined atmospheric pressure Pa and the newly determined derived value for the atmospheric pressure Pap, and if Pap is not less than Pa control goes to step 84.

In step 84, the newly determined derived value of the atmospheric pressure Pap is determined as the atmospheric pressure Pa. In other words, when the throttle switch 60 is in the on state the atmospheric pressure Pa is updated to a smaller value, whereas when the throttle switch 60 is in the off state, the atmospheric pressure Pa is updated to a larger value.

By carrying out the detection of the atmospheric pressure according to the above described flowchart, an atmospheric pressure substantially equal to the actual atmospheric pressure is detected.

In the above described embodiment, when the atmospheric pressure is not more than a certain value, diagnosis is completely prevented from being carried out, but in the diagnosis device of the present invention, equally corrections may be applied to the parameter comparison values for determining the exhaust gas recycling region, according to the fluctuations in atmospheric pressure.

Next the operation of another embodiment of the diagnosis device according to the present invention is described with reference to the flowchart shown in FIG. 6.

Figure 6:
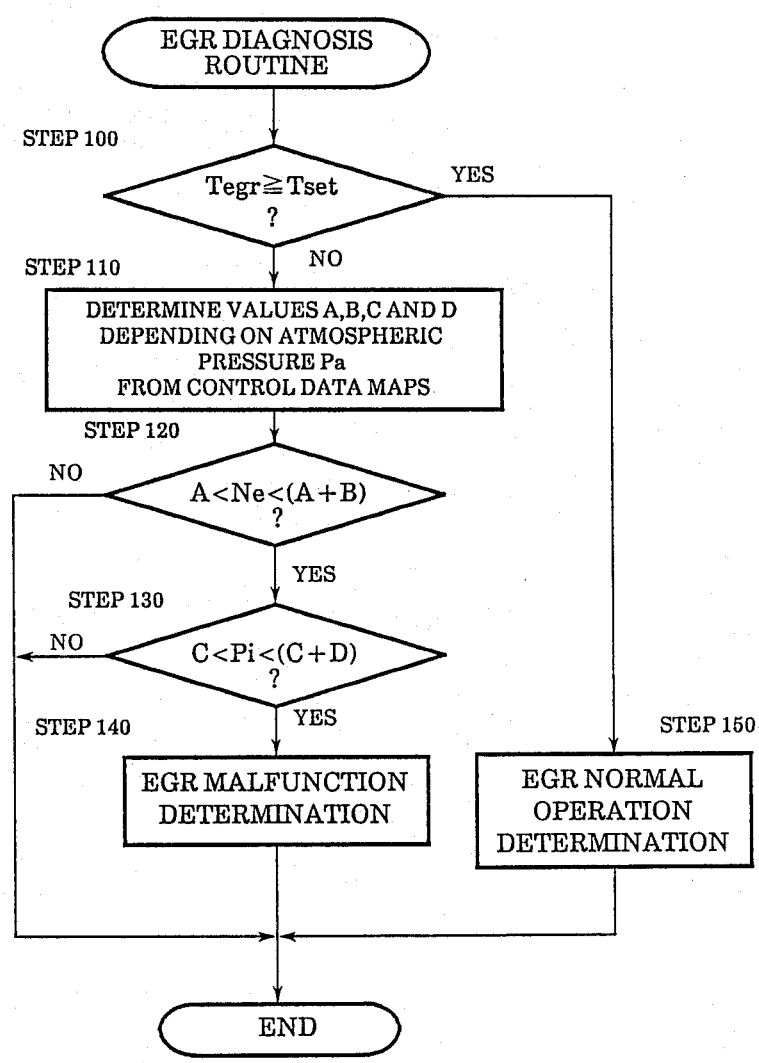
FIG. 6 is a flowchart showing the operation of another embodiment of the diagnosis device according to the present invention.

The EGR diagnosis routine shown in FIG. 6 is executed as an interrupt routine at a certain time interval, and initially in step 100, a decision is made as to whether or not the exhaust gas recycling passage temperature Tegr detected by the temperature sensor 59 is higher than a decision temperature Tset. When Tegr is at least Tset, then exhaust gas recycling is being carried out, and at this time the situation is regarded as normal and control goes to step 150, whereas when Tegr is not at least Tset exhaust gas recycling is not being carried out and at this time control goes to step 110.

In step 110, depending on the atmospheric pressure Pa, decision values (comparison values) A, B, C and D are determined from control data maps as shown in FIG. 7 and FIG. 8. The decision values A and B are decision values for the engine revolution rate, and decrease with a decrease in the atmospheric pressure Pa. The decision values C and D are decision values for the intake manifold pressure Pi, and these also both decrease with a decrease in the atmospheric pressure Pa. Determination of the atmospheric pressure Pa may in this embodiment also be carried out by substituting the intake manifold pressure detected by the intake manifold pressure sensor 58 immediately before starting the engine. After step 110, control goes to step 120.

In step 120, a decision is made as to whether or not the revolution rate Ne of the internal combustion engine 1 detected by the revolution rate sensor 56 is least the decision value A and not more than the decision value A+B which is greater than A. When Ne is greater than A and less than A+B control goes to step 130.

In step 130, a decision is made as to whether or not the intake manifold pressure Pi detected by the intake manifold pressure sensor 58 is at least the decision value C and not more than the decision value C+D which is greater than C. When Pi is greater than C and less than C+D control goes to step 140.

In step 140, the malfunction decision causes the indicator lamp 62 to be turned on. Turning on the indicator lamp 62 allows the user to be made aware that there is a failure in the exhaust gas recycling device.

In step 150, the normal decision means that the indicator lamp 62 is turned off, or is not turned on. At this point the exhaust gas recycling device is operating normally.

As described above, the decision values for the engine revolution rate and the intake manifold pressure, in other words the comparison values, are determined according to the atmospheric pressure, whereby as shown in FIG. 9 if the EGR operation region varies with a variation in the atmospheric pressure the diagnosis region also varies with it, and the diagnosis region does not go outside the EGR operation region.

By carrying out the exhaust gas recycling device diagnosis as described above, the exhaust gas recycling device diagnosis is carried out reliably without erroneous decisions, irrespective of fluctuations in atmospheric pressure.

Figure 10:
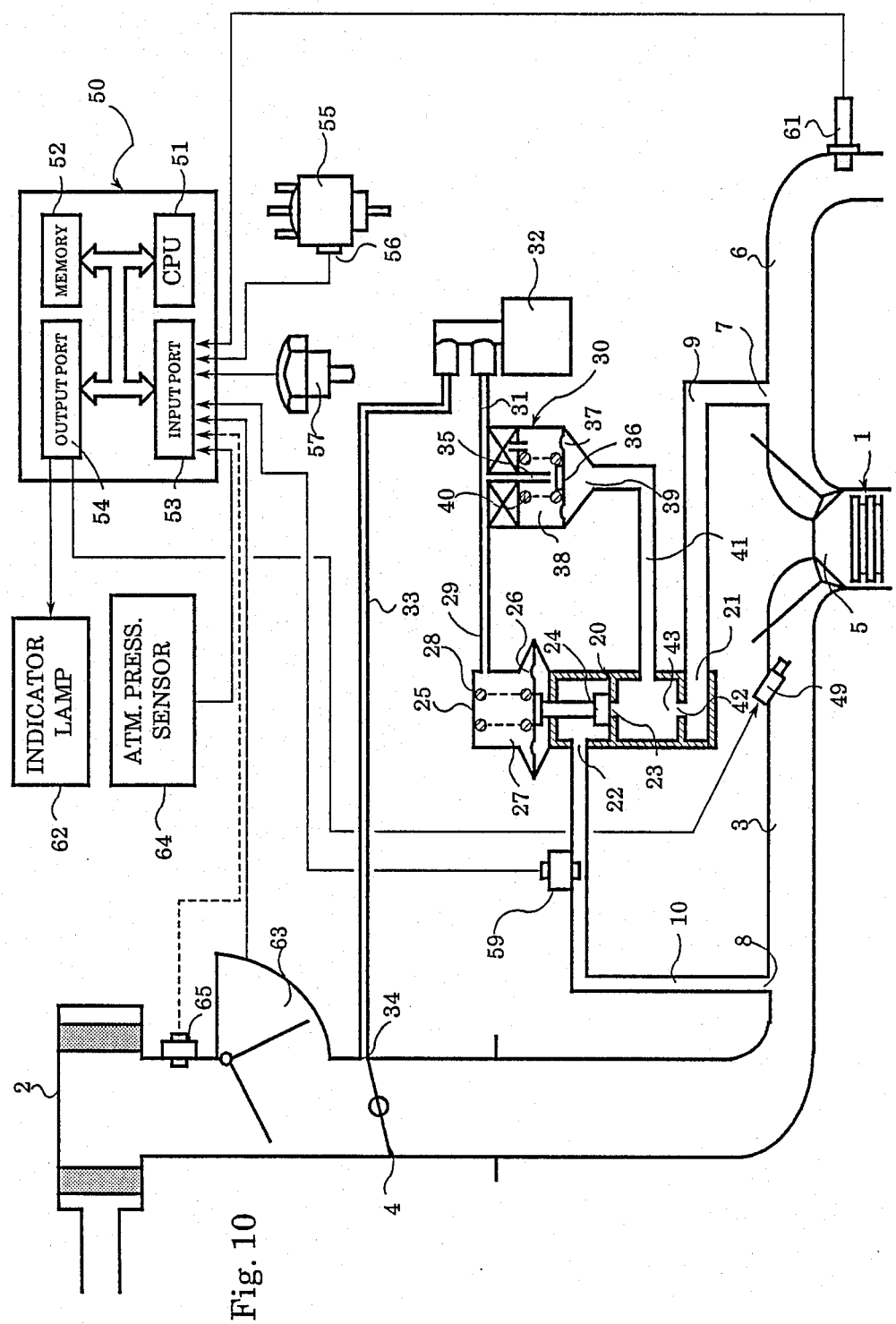
FIG. 10 is a schematic structural diagram of another embodiment of an internal combustion engine provided with the exhaust gas recycling device diagnosis device according to the present invention.

Next using FIG. 10 another embodiment of an internal combustion engine fitted with an exhaust gas recycling device diagnosis device according to the present invention is described. In this embodiment, the internal combustion engine 10 takes air into a combustion chamber 5 through an air cleaner 2, an air flow meter 63, a throttle valve 4 and an intake manifold 3; fuel is supplied by injection from a fuel injector 49 provided in the intake manifold 3, and the combustion products, in other words the exhaust gases, are expelled to an exhaust manifold 6.

Figure 11:
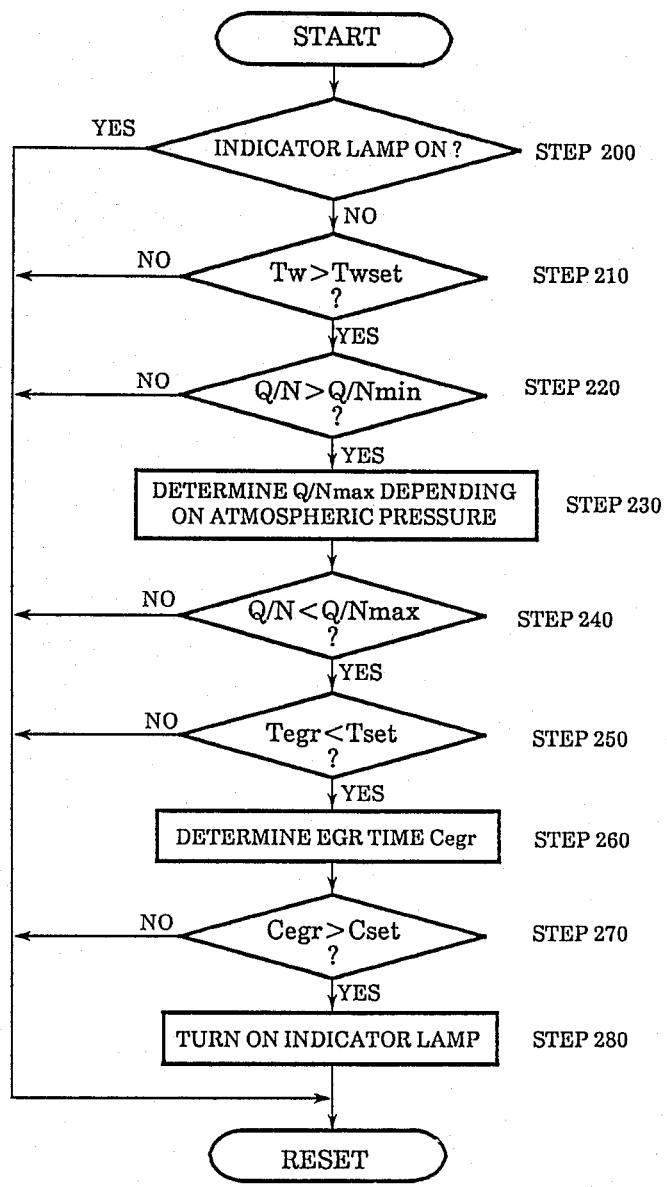
FIG. 11 is a flowchart showing one embodiment of the operation of the exhaust gas recycling device diagnosis device in an internal combustion engine shown in FIG. 10.

The microcomputer 50 is constructed so as to carry out fuel injection amount control of the fuel injector 49 and also the exhaust gas recycling device disgnosis; it receives information relating to the rotation rate of the internal combustion engine 1 from a rotation rate sensor 56, information relating to the coolant temperature of the internal combustion engine 1 from a coolant temperature sensor 57, information relating to the intake air flow rate from the air flow meter 63, information relating to the temperature in the line 10 from a temperature sensor 59 provided at an intermediate point in the exhaust gas recycling line 10, information relating to the atmospheric pressure from an aneroid bellows type of atmospheric pressure sensor 64, and information relating from an oxygen sensor 61 provided in the exhaust manifold 6; fuel injection amount control is carried out based on this information and following the flowchart shown in FIG. 11 a diagnosis is also made as to whether or not the exhaust gas recycling device is operating normally, and whn a decision is made that the exhaust gas recycling device is not operating normally, an indicator lamp 62 is turned on.

The fuel injection amount control is carried out by determining the basic fuel injection amount Tp based on computing the ratio Q/N of the air intake flow rate Q detected by the air flow meter 63, and the engine revolution rate N detected by the revolution rate sensor 56, determining an engine warm up correction coefficient Ktw based on the coolant temperature Tw detected by the coolant temperature sensor 57, determining an air/fuel ratio correction coefficient Kf based on the air/fuel ratio signal from the oxygen sensor 61, and determining the fuel injection time by a calculation based on the basic fuel injection amount Tp and the above correction coefficients Ktw and Kf.

Next the operation of the diagnosis device in this embodiment is described with reference to the flowchart shown in FIG. 11.

The EGR diagnosis routine shown in FIG. 11 is executed as an interrupt routine at a regular time interval, and first in step 200 a decision is made as to whether or not the indicator lamp 62 is on, or in other words is already illuminated. When the indicator lamp 62 is in the on state, then a decision has already been made that the exhaust gas recycling device is functioning abnormally, and at this time the routine terminates, whereas when the indicator lamp 62 is not on, control proceeds to step 210.

In step 210, a decision is made as to whether or not the coolant temperature Tw detected by the coolant temperature sensor 57 is at least a predetermined value Twset, which is for example 60 degrees C. When Tw is greater than Twset control goes to step 220, and otherwise since exhaust gas recycling is not being carried out the routine terminates.

In step 220, the intake air amount per stroke of the engine Q/N is calculated from the intake air flow rate Q detected by the air flow meter 63 and the revolution rate N of the internal combustion engine 1 detected by the revolution rate sensor 56, and a decision is made as to whether or not Q/N is at least a lower bound Q/Nmin. When Q/N is greater than Q/Nmin control goes to step 230, and otherwise the routine terminates.

Figure 12:
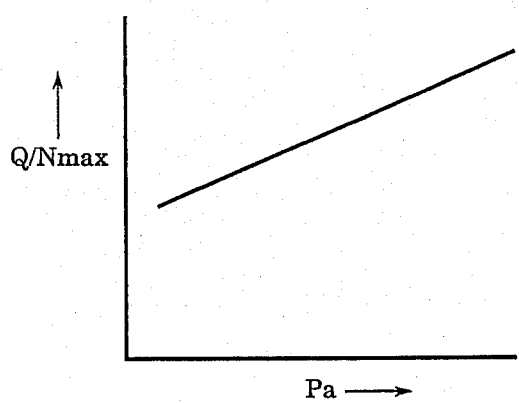
FIG. 12 is a graph showing upper bound characteristics of the corresponding intake air amount for one stroke of the engine corresponding to the atmospheric pressure.

In step 230, an upper bound Q/Nmax of the intake air amount per one stroke of the engine Q/N for which exhaust gas recycling should be carried out is determined according to the atmospheric pressure Pa detected by the atmospheric pressure sensor 64 according to characteristics as shown in FIG. 12. The upper bound Q/Nmax decreases with a decrease in the atmospheric pressure. After step 230, control goes to step 240.

In step 240, a decision is made as to whether or not the intake air amount per one stroke of the engine Q/N is not more than the upper bound Q/Nmax. When Q/N is less than Q/Nmax, it is determined to be in the exhaust gas recycling region, and at this time control goes to step 250, whereas otherwise the routine terminates.

In step 250, a decision is made as to whether or not the exhaust gas recycling passage temperatue Tegr detected by the temperature sensor 59 is not more than a predetermined value Tset. When Tegr is less than Tset, control goes to step 260, whereas otherwise the routine terminates.

In step 260, the elapsed time since a "yes" decision was made in step 240, in other words since it was determined to be in the exhaust gas recycling operation region, or in other words the EGR time Cegr is determined from a count value. After step 260, control goes to step 280.

In step 270, a decision is made as to whether or not the EGR time Cegr is greater than a predetermined decision time Cset. When Cegr is greate than Cset, a decision is made that the exhaust gas recycling device has malfunctioned, and control goes to step 280, whereas otherwise the routine terminates.

In step 280, because of the malfunction decision, the indicator lamp 62 is put in the on state, or in other words turned on.

Figure 13:
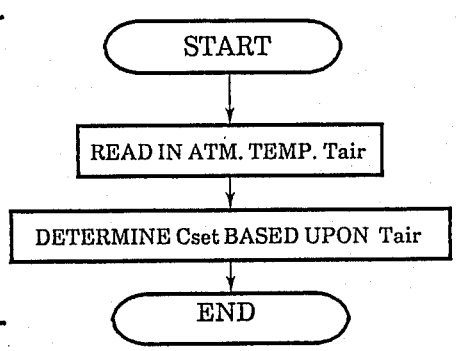
FIG. 13 is a flowchart showing one embodiment of a routine for setting the decision time of the diagnosis according to the external temperature.
Figure 14:
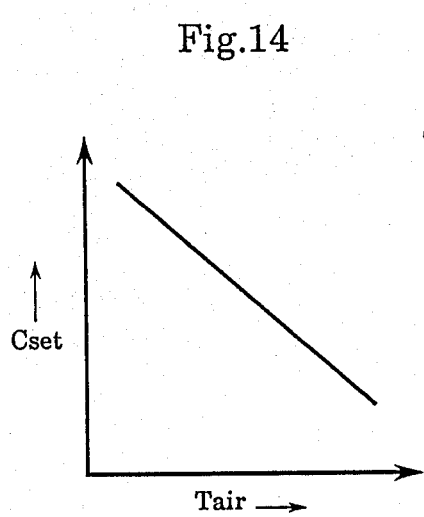
FIG. 14 is a graph showing an example of EGR decision time characteristics according to the external temperature.
Figure 17:
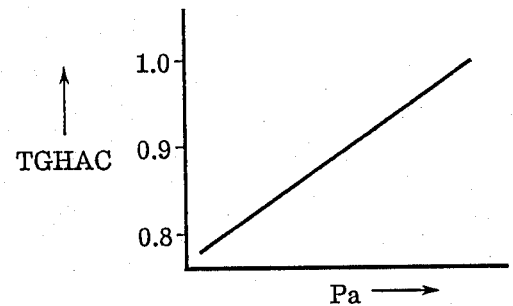
FIG. 17 is a graph showing the relationship between atmospheric pressure and an air/fuel ratio learning high altitude compensation factor.

The predetermined decision time Cset for the EGR time in the above described embodiment may be constant, but also as shown in FIG. 13 and FIG. 14, the decision time Cset may be variable according to the external temperature Tair. This decision time Cset may be set longer the lower the external temperature Tair, and therefore an erroneous malfunction decision when the external temperature is low can be avoided.

As the external temperature Tair may be employed the intake air temperature detected by an intake air temperature sensor 65 provided on the engine intake system.

Figure 15:
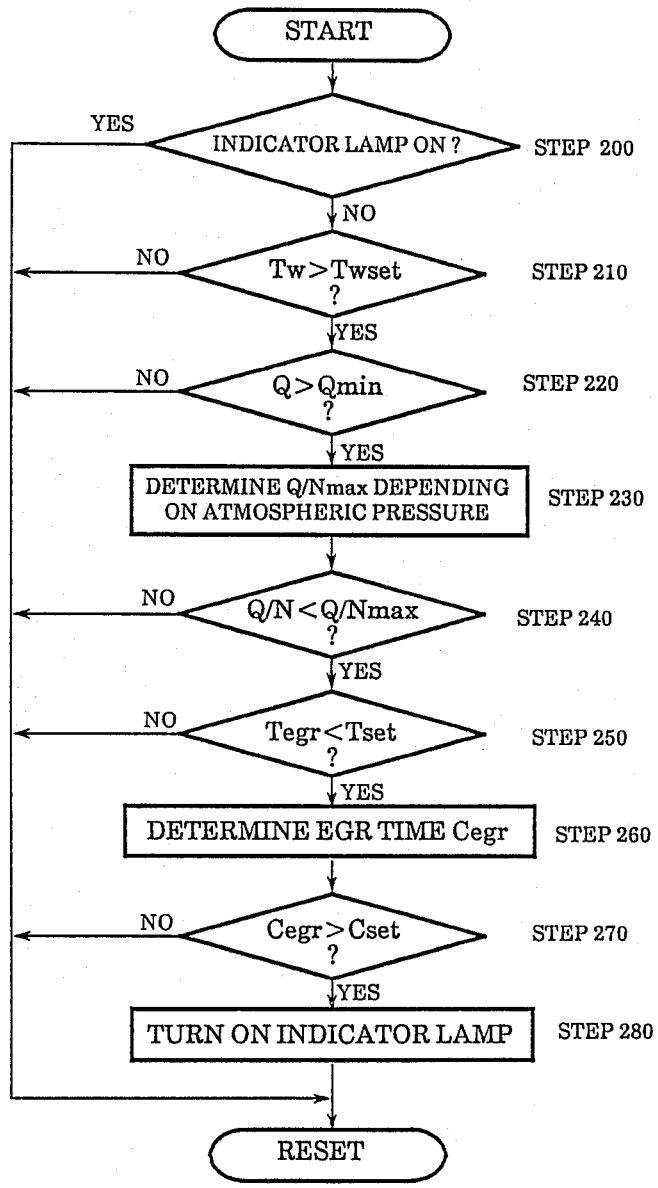
FIG. 15 is a flowchart showing a variant of the diagnosis routine of the exhaust gas recycling device shown in FIG. 13.

In the above described embodiment, the EGR operation region, or in other words the EGR diagnosis region, is such that the coolant temperature Tw is at least a set value Twset, the air intake amount per one stroke of the engine Q/N is at least bound Q/Nmin and at most an upper bound Q/Nmax, but this EGR diganosis region may be alternatively determined so that the coolant temperature Tw is at least a certain value Twset, the intake air flow rate Q detected by the air flow meter 63 is at least a lower bound Qmin, and the intake air amount per ont stroke of the engine Q/N is at most an upper bound Q/Nmax, and in this case the diagnosis is carried out according to the flowchart shown in FIG. 15.

Instead of direct detection of the atmospheric pressure, the atmospheric pressure may be determined by using learning control in feedback control of the air/fuel ratio based on an air/fuel ratio signal from the oxygen sensor 61. This learning control value is termed an air/fuel ratio learning high altitude correction coefficient. Such an air/fuel ratio learning high altitude correction coefficient is already in use in high altitude correction control of the air/fuel ratio, and more detailed description may be found by making reference to Japanese Patent Laying Open Publication Sho No. 60-50249 (1985) and Japanese Patent Laying Open Publication Sho No. 60-53635 (1985).

Figure 16:
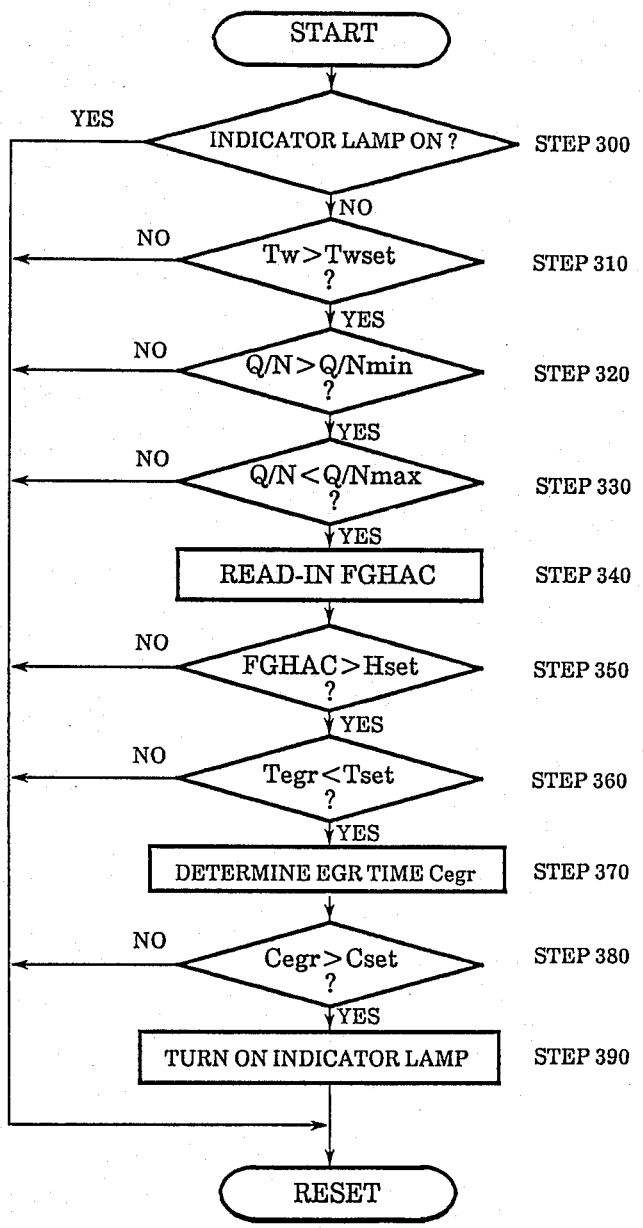
FIG. 16 is a flowchart showing the operation of yet another embodiment of the exhaust gas recycling device diagnosis device according to the present invention.

Next with reference to FIG. 16, an embodiment is described in which air/fuel ratio learning high altitude correction coefficient is used as an atmospheric pressure correction for EGR diganosis.

The EGR diagnosis routine shown in FIG. 16 is executed as an interrupt routine at a certain time interval, and first in step 300 a decision is made as to whether or not the indicator lamp 62 is in the on state, in other words is turned on. If the indicator lamp 62 is on, then a decision has already been made that the exhaust gas recycling device is abnormal, and at this point the routine terminates, whereas if the indicator lamp 62 is not on, control goes to step 310.

In step 310, a decision is made as to whether or not the coolant temperature Tw detected by the coolant temperature sensor 57 is at least a certain value Twset, for example 60 degrees C. When Tw is greater than Twset, control goes to step 320, whereas otherwise exhaust gas recycling is not being carried out, and the routine terminates.

In step 320, the intake air amount per one stroke of the engine Q/N is calculated from the intake air flow rate Q detected by the air flow meter 63 and the rotation rate N of the internal combustion engine 1 detected by the rotation rate sensor 56, and a decision is made as to whether or not Q/N is at least a predetermined lower bound Q/Nmin. When Q/N is greater than Q/Nmin, control goes to step 330, whereas otherwise the routine terminates.

In step 330, a decision is made as to whether the intake air amount per one stroke of the engine Q/N is not more than a predetermined upper bound Q/Nmax. When Q/N is less than Q/Nmax, it has been determined as the exhaust gas recycling region, and at this point control proceeds to step 340, whereas otherwise the routine terminates.

In step 340, the air/fuel ratio learning high altitude correction coefficient for air/fuel ratio control (FGHAC) is obtained. After step 340, control goes to step 350.

In step 350, a decision is made as to whether the air/fuel ratio learning high altitude correction coefficient FGHAC is at least a predetermined value Hset. When FGHAC is greater than Hset, the atmospheric pressure is at least a certain value, and diagnosis can be accurately carried out, so that in this case control goes to step 360 to carry out diagnosis, whereas otherwise diagnosis is avoided and the routine terminates.

In step 360, a decision is made as to whether or not the exhaust gas recycling passage temperature Tegr detected by the temperature sensor 59 is not more than a predetermined value Tset. When Tegr is less than Tset control goes to step 370, whereas otherwise the routine terminates.

In step 370, the time since a "yes" decision was made in step 330, in other words since it was determined to be the exhaust gas recycling region, or in other words the EGR time Cegr is derived. After step 370, control goes to step 380.

In step 380, a decision is made as to whether the EGR time Cegr is greater than a decision time Cset. When Cegr is greater than Cset, the exhaust gas reycling is determined to have malfunctioned, and control goes to step 390, whereas otherwise the routine terminates.

In step 390 the indicator lamp 62 is turned on to indicate the malfunction decision.

In all of the above embodiments exhaust gas recycling device diagnosis can be carried out reliably without erroneous decisions regardless of the fluctuations in the atmospheric pressure.

Although the invention was described in the above with respect to some preferred embodiments thereof, it should be understood that the present invention is not limited to those particular embodiments and that various modifications are possible about such embodiments without departing from the scope of the invention.

We claim:

1. A diagnosis device for detecting a malfunction of an exhaust gas recycling device of an internal combustion engine and issuing a warning of said malfunction, said exhaust gas recycling device performing exhaust gas recycling only when certain engine operating conditions aare met, said device comprising:

first means for sensing certain engine operating parameters generally corresponding to said certain engine operating conditions and determining whether the engine is operating with performance of the exhaust gas recycling; second means for sensing certain performance parameters indicative of performance of the exhaust gas recycling and determining whether exhaust gas recyling is actually performed; and third means for determining a malfunction of the exhaust gas recyclying device only when said first means determine that the engine is operating with performance of the exhaust gas recycling and said second means determines that the exhaust gas recycling is not actually performed; said first means sensing atmospheric pressure and modifying the determination of whether the engine is operating with performance of exhaust gas recycling in response to atmospheric pressure.

2. The diagnosis device of claim 1, wherein diagnosis is avoided when the atmospheric pressure is not more than a certain value.

3. The diagnosis device of claim 1, wherein said certain engine operating parameters are at least one of intake manifold pressure and intake air flow rate of the engine and the engine revolution rate.

4. The diagnosis device of claim 1, wherein said certain engine operating parameters are the intake manifold pressure of the engine and the engine revolution rate.

5. The diagnosis device of claim 1, wherein said certain engine operating parameter is intake air amount per one stroke of the engine derived from intake air flow rate of the engine and engine revolution rate, and when the intake air amount per one stroke of the engine is within certain values it is determined that exhaust gas recycling is performed.

6. The diagnosis device of claim 1, wherein said engine operating parameters are intake air flow rate of the internal combustion engine and intake air amount per one stroke of the internal combustion engine calculated from the intake air flow rate and engine revolution rate, and it is determined that exhaust gas recycling is performed when the intake air flow rate is at least a certain value, and the intake air amount per one stroke of the engine is not more than a certain value.

7. The diagnosis device of claim 1, wherein said said first means includes an intake manifold pressure sensor, intake manifold pressure detected by the intake manifold pressure sensor immediately before starting the engine being taken as the atmospheric pressure.

8. The diagnosis device of claim 1, wherein atmospheric pressure is determined from an air/fuel ratio learning high altitude compensation coefficient for air/fuel ratio control of the engine.

9. The diagnosis device of claim 1, wherein said second means determines whether a temperature of an exhaust gas recycling passage is not more than a certain value over a certain time interval, said certain time interval being determined according to atmospheric temperature.

* * * * *